JOHN A. CORNISH.
Improvement in Straw Cutters.
No. 119,326. Patented Sep. 26, 1871.
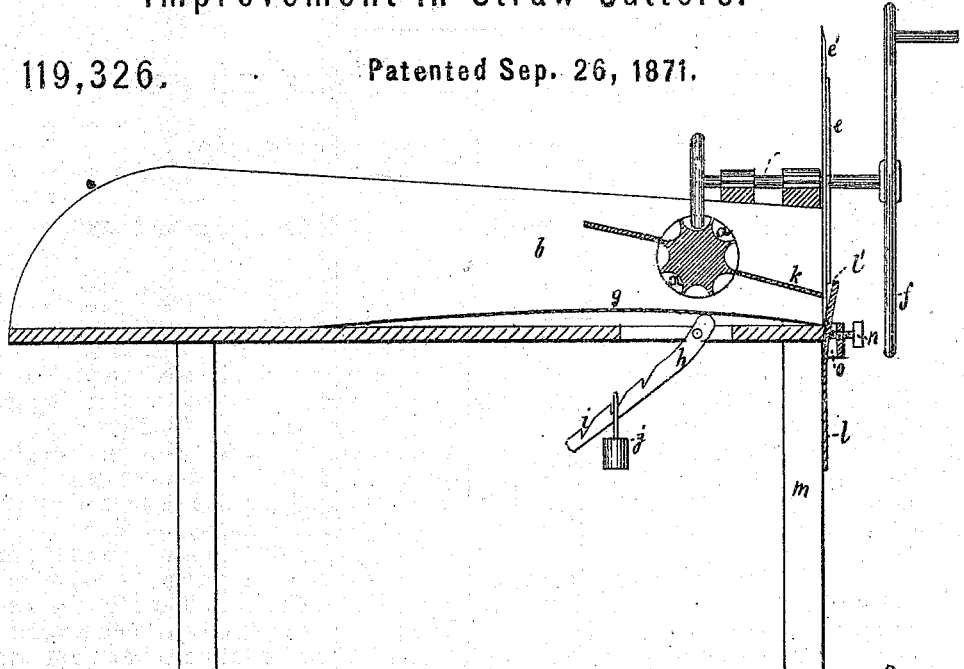
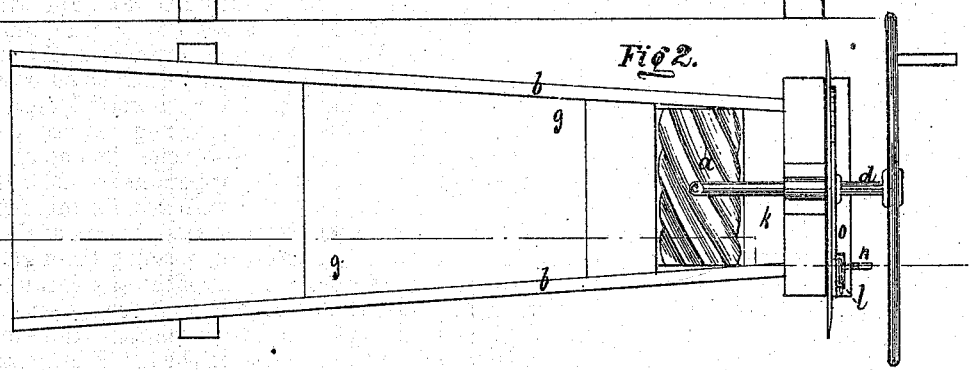
Fig. 2.
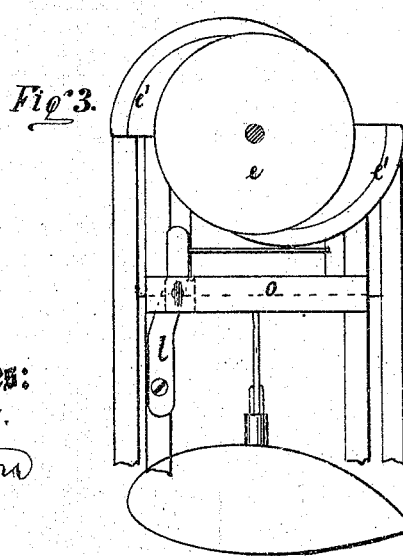
Fig. 3.
Witnesses:
G. Mathys.
Inventor:
John A. Cornish.
Per
Attorneys.

ium,326

UNITED STATES PATENT OFFICE.

JOHN A. CORNISH, OF MARSHFIELD, MISSOURI.

IMPROVEMENT IN STRAW-CUTTERS.

Specification forming part of Letters Patent No. 119,326, dated September 26, 1871.

*To all whom it may concern:*

Be it known that I, JOHN A. CORNISH, of Marshfield, in the county of Webster and State of Missouri, have invented a new and useful Improvement in Hay and Straw-Cutters; and I do hereby declare that the following is a full, clear, and exact description thereof, which will enable others skilled in the art to make and use the same, reference being had to the accompanying drawing forming a part of this specification, in which—

Figure 1 is a longitudinal sectional elevation, Fig. 2 a top view, and Fig. 3 an end view with the crank-wheel removed.

Similar letters of reference indicate corresponding parts.

My invention is designed as an improvement in the class of straw-cutters having fluted feed-rollers, operated directly from the shaft carrying the cutter-disk; and consists in so arranging the respective parts that the feed-roller shall rotate intermittently, or at intervals when the cutters are not operating; and in the relative construction of the feed-roller, and a bar on the end of the said shaft; and in the provision of a spring emery-pad for sharpening the cutter-disk and keeping it up to its work, or in close contact with the cutter-bar, as hereinafter described.

Referring to the drawing, $a$ is the spirally-fluted feed-roller, the same being mounted crosswise of the box $b$, through which the hay passes to be cut. The bar $c$ is affixed at right angles to the inner end of a shaft, $d$, mounted lengthwise of the box, and bearing the cutter-disk $e$, and at its outer end a crank-wheel, $f$. By the rotation of the shaft $d$ the bar $c$ is pressed against the sides of the corrugations of the roller $a$, one after another, thus turning the same, and at a speed corresponding to that of the cutter-disk $e$. The roller $a$ feeds the hay to the cutters, the hay passing between the roller $a$ and an apron, $g$, of sheet metal, secured at $g'$ to the bottom of the box $b$, and free at the end nearest the roller $a$. Through a slot in the bottom of the box $b$ passes a lever, $h$, whose upper end bears against the apron $g$. The upper edge of the lever $h$ has notches $i$ placed at equal intervals, and with said lever is connected a sliding weight, $j$, the same having a pin that enters either of the notches $i$, by means of which the weight is held in place. The weight $j$, according to its position, causes the lever $h$ to press the apron $g$ against the roller $a$ with greater or less force. When there is but a small quantity of hay in the box the apron should press upward with more force than when the quantity is large, the apron taking the place of a lower roller. The lever $h$ is inscribed at every notch with the figures denoting the number of pounds of pressure that will be exerted on the apron with the weight in that notch. The disk $e$ has knives $e'$ standing off from its periphery, the same having curved cutting-edges and straight radial ends. The knives $e'$ work with a drawing cut across the end of the box $b$, and after they pass the hay is fed forward under the disk in readiness for the next stroke. The roller $a$ feeds twice at each revolution of the disk $e$, the bar $c$ being set at right angles with the ends of the knives $e'$, so that the feedings take place between the cuts when the end of the box $b$ is open. A plate, $k$, placed between the roller $a$ and the end of the box $b$, forms a passage for the hay converging toward the cutter. An elastic bar, $l$, is attached to one of the legs, $m$, of the box, the upper end of said bar being free, and being provided on its inner side with a perforated leather pad, $l'$ containing emery-powder. A screw, $n$, passing through a bar, $o$, placed across the ends of the box $b$, can be turned against the bar $l$ so as to press the pad $l'$ against the cutters $e'$ and thus sharpen the same, when dull, without stopping them. It is apparent that the round bar $c$ will operate in conjunction with the spiral flanges of the feed-roller so as to cause the latter to have a smooth, regular, intermittent movement, which could not be obtained without excessive friction, by means of a spirally-armed wheel and a straight fluted or grooved roller.

Having thus described my invention, what I claim as new, and desire to secure by Letters Patent, is—

1. The spring-bar $l$ provided with the emery-pad $l'$, and attached to the leg $m$ of the box, through which passes the screw $n$ for adjusting said bar, as shown and described.

2. The straight round bar $c$ and the spirally-fluted feed roller $a$, arranged to operate as specified.

3. The bar $c$, spirally-fluted feed-roller $a$, shaft $d$, and cutter-disk $e\ e'$, constructed and arranged as shown and described, whereby the straw or other material is cut between the intervals of feeding, as specified.

Witnesses:   J. A. CORNISH.
 SOLON C. KEMON,
 CHAS. A. PETTIT. (34)